Figure 3:
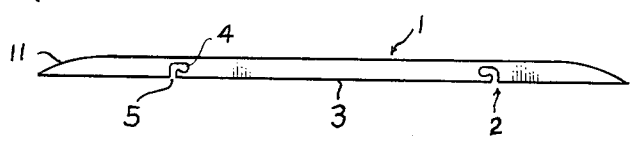

May 15, 1956 J. J. BOLAND 2,745,473
BACK REST FOR VEHICLE RIDING
Filed Nov. 13, 1953

INVENTOR.
JOHN J. BOLAND
BY Nicholas J. Garofalo
ATTORNEY

United States Patent Office 2,745,473
Patented May 15, 1956

2,745,473
BACK REST FOR VEHICLE RIDING
John J. Boland, West Hempstead, N. Y.

Application November 13, 1953, Serial No. 391,833

4 Claims. (Cl. 155—182)

This invention relates to new and useful improvements in back rests. It has for its general object a novel and practical form of back rest that is particularly useful in motor vehicles for easing back strain in riding.

The pains and discomforts of back strain are well known to those who spend most of their day in riding or driving a motor vehicle, such as, salesmen, taxi drivers, long distance riders and the like. Sitting in an erect position for long periods of time with the back of the person improperly supported by the soft and resilient back portion of a vehicle seat strains and tires the back muscles. It causes a multiple of discomforts as well as early fatigue. On long trips the latter often lead to ragged nerves, nasty dispositions and, quite frequently, serious accidents.

Now, I have invented a simple device to relieve back strain in automobile riding which is economically within the reach of all. In general, it comprises a plurality of slats, so constructed and arranged as to drape over the back part of a car seat. It serves to support the occupant's back, and in doing so it materially adds to the rider's comfort. It reduces to a minimum back strain of the person as well as the consequent discomforts.

A further object of the invention is, therefore, a simple and practical means of appreciably reducing back strain in motor vehicle riding.

Another object of the invention is to provide an arrangement of slats to drape over the back portion of a car seat in such manner as to alleviate the discomforts of long riding.

A still further object of the invention is to provide a slat having a particular notch formation therein whereby it may, together with other similar slats, be readily assembled and retained on flexible connecting means to form a flexible back rest unit for a motor vehicle seat.

A feature of the invention lies in the particular arrangement and formation of notches in each slat whereby a slat may be readily assembled or disassembled from ropes stringing the several slats together as a unit.

The invention further lies in the general construction and arrangement of the back rest as a whole, as well as in the individual elements thereof and in their cooperative association with one another.

The invention together with its various objects, features and advantages will be further understood as this specification unfolds in greater detail and as it is read in conjunction with the accompanying drawings.

Figure 4:
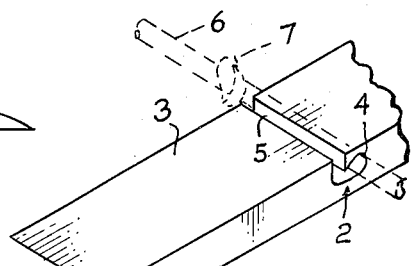
Figure 2:
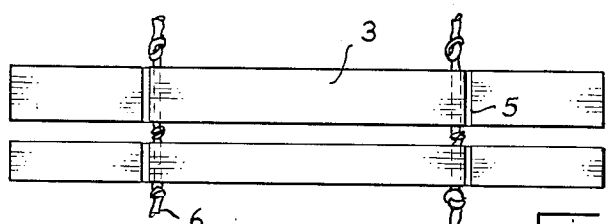
Figure 1:
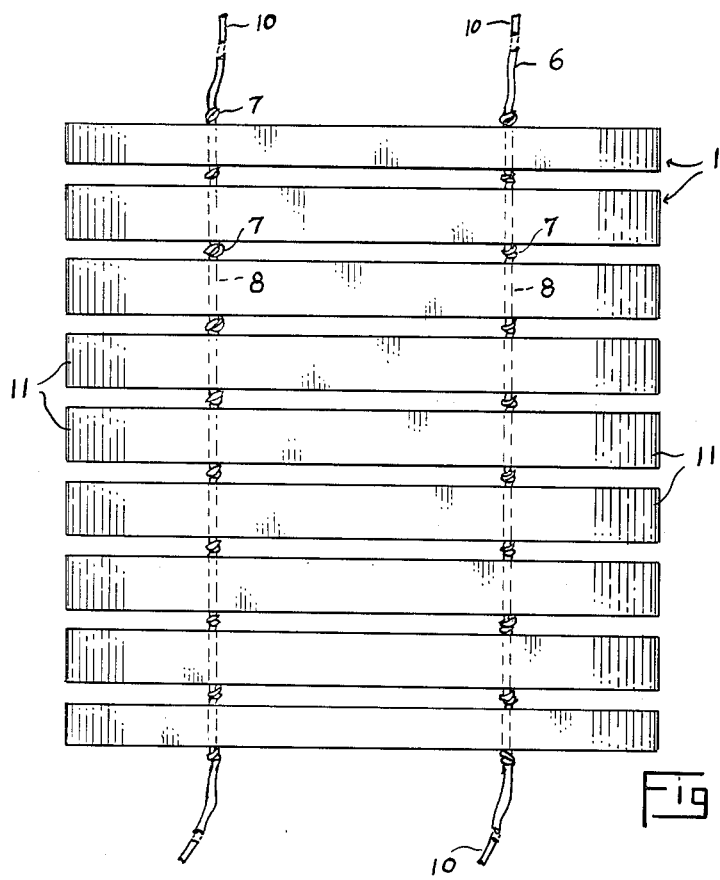

In the drawings, wherein a back rest embodying the invention is illustrated,

Fig. 1 is a top plan view thereof;
Fig. 2 is a bottom plan view of a few of the slats;
Fig. 3 is a side elevational view of a single slat; and
Fig. 4 is a detail of an end section of a slat directed to the notch formation.

In the drawings there is disclosed a plurality of slats 1 of similar structure, formed of rigid material; such as, wood, though they may well be fashioned of plastic or other firm material. Each slat includes a pair of notches or slotted openings 2 transversely across the undersurface 3 thereof. One notch of the pair is near the left end of the slat, and the other is near the right end. The nature of an opening 2 is well shown in Figs. 3 and 4. It comprises a hole portion 4 that extends transversely through the slat. Communicating with the hole along a side thereof is a slot 5. The latter extends from the hole at right angles and communicates with the undersurface 3 of the slat and runs across the width of the slat. The opening 2 is in the nature of a J slot. The hole portion 4 of the opening acts as a pocket and is adapted to contain a rope 6 therein. The hole may be of a diameter slightly greater than that of the rope so as to freely contain the rope. The slotted portion 5 of the opening is, however, of a width slightly narrower than the diameter of the rope. In this arrangement the rope cannot escape by way of the slot out of the hole to the outside, and the hole acts as a retaining pocket for the rope therein. To insert the rope into the hole portion 4, the rope is stretched slightly and is then squeezed down the slot and into the pocket hole.

A plurality of slats 1 may be assembled together to form a flexible back rest as in Fig. 1, by stringing them in ladder arrangement on a pair of light, but strong ropes 6 of substantially equal length. The ropes are knotted at a plurality of points 7 spaced equally apart. The space 8 separating each knot is substntially equal to the width of a slat. The ropes are positioned in spaced parallel relation to one another with the knots 7 of one aligned with correspondingly positioned knots of the other. In the left end opening 2 of each slat a section 8 of one rope is received, and in the right end opening of each slat an oppositely positioned section 8 of the other rope is received. In this arrangement the several slats are held as a unit in parallel relation to one another and spaced from one another substantially by the size of the intermediate knots 7. The assembled slats form a unit as in Fig. 1 which is flexible between each slat due to the flexibility of the knotted ropes.

In use, the unit is draped over the back portion of a car seat. It is secured in place by extended portions 10 of each rope, which may be fastened to any suitable support about the seat; for example, the blanket bar behind the seat, or to fasteners at the bottom of the seat. Because of the flexibility of the unit between the slats, the unit is adapted to conform to the contours of the seat back. By having the space 8 separating each knot substantially equal to the width of the slat a smooth upper surface is provided by the back rest, which would not otherwise be the case were the slats spaced substantially apart and their edges caused to project outward.

The slats of the assembled unit tend to support the back muscles of the rider. They prevent them from sagging and weakening, and thereby avoid weak back muscles, fatigue and the consequent discomforts thereof. The assembled unit may be lengthened as desired by adding more slats and knots to the ropes. It is preferable that the unit contain sufficient slats to cover the back of the seat and protect the whole of the rider's back, and in furtherance of this intent it is desired that the slats be of sufficient length to fully accommodate the width of the rider's back. A preferred length of the slats is about 24 inches. Further, the slats are tapered at their ends 11, so that a smooth upper surface is afforded to the rider's back completely across the unit.

The slats are of sufficient thickness and strength to accommodate the openings 2, and desirably are about three-eighths of an inch in thickness.

A further feature of the unit concerns the peculiar arrangement of the openings 2 in each slat. It is to be noted that with respect to the left opening the pocket portion 4 thereof is located on the right of the slot 5; while with respect to the opening 2 at the right end of the slat, the pocket portion 4 thereof is located on the left of the slotted part 5. This arrangement has the decided advantage of further securing the slats to the ropes and limiting the possibility of the latter, when being shifted to the right or left, from escaping from the slats through the slotted portions of the openings.

Another feature and advantage of the slotted openings in each slat is the ease with which the individual slats may be assembled upon the ropes and, if circumstances warrant, may be selectively removed and replaced without disturbing the entire unit.

While I have shown and described a preferred form of my invention, it is my intent, however, to claim the invention not only as shown and illustrated, but also in all such forms and modifications thereof as may be reasonably construed to be within the spirit of the invention and the scope of the appended claims.

I claim:

1. Means for relieving back strain in automobile riding, comprising in combination with a seat of an automobile having an upright back part, a pair of elongated rope elements secured in a substantially north, south direction over the face of the back part in substantial spaced parallel relation to each other, and a plurality of rigid slats, each detachably hooked transversely of the rope elements in close parallel relation to one another knots in each rope element spacing one slat from the next below, and the slats each having a broad smooth outer surface that is tapered at the ends thereof and is adapted to contact and support the back of the rider occupying the seat.

2. Means as set forth in claim 1 wherein the spacing between each slat is sufficiently close as to present a substantially continuous surface of the plurality of slats to the rider's back, and the slats being of sufficient width to support the whole of the rider's back.

3. Means for relieving back strain in automobile riding comprising in combination with a seat of an automobile having an upright back member, a pair of elongated rope elements secured in a north-south direction over the face of the back member in spaced parallel relation to one another, a plurality of firm slats, a pair of bayonet slots in the underside of each slat, each slat detachably hooked by means of the pair of bayonet slots transversely to the rope elements and in parallel relation to one another, the bayonet slots opening out transversely of the underside of the slats and serving to allow ready removal of the slats individually from the rope elements, knots in each rope element spacing one slat from the next below, and the slats each having a broad smooth outer surface adapted to contact and support the back of the rider occupying the seat.

4. In a back rest of the character described including a pair of ropes in parallel spaced relation to one another, an elongated slat having a broad smooth top surface, a pair of J slots in spaced relation to one another and opening out transversely of the underside of the slat, the long arm of each slot opening out to the underside of the slat and serving to admit a rope therethrough to the hook portion of the slot, the long arm of each slot being of a width slightly less than the thickness of the rope received therein and serving to hinder slipping of the rope from the hook portion of the slot, and the hook portion of one slot extending in a direction toward one end of the slat and the hook portion of the other extending in the opposite direction.

References Cited in the file of this patent

UNITED STATES PATENTS

| | | |
|---|---|---|
| 155,157 | Holt | Sept 22, 1874 |
| 1,455,239 | Childress | May 15, 1923 |
| 1,968,762 | Hamblin | July 31, 1934 |
| 2,551,976 | Smith | May 8, 1951 |